United States Patent [19]

Sands

[11] 4,421,562

[45] Dec. 20, 1983

[54] MANUFACTURING PROCESS FOR HOLLOW MICROSPHERES

[75] Inventor: Bruce W. Sands, Malvern, Pa.

[73] Assignee: PQ Corporation, Valley Forge, Pa.

[21] Appl. No.: 478,006

[22] Filed: Mar. 23, 1983

Related U.S. Application Data

[63] Continuation of Ser. No. 253,139, Apr. 13, 1980, abandoned.

[51] Int. Cl.$^3$ .............................................. C04B 31/00
[52] U.S. Cl. ........................................ 106/75; 264/13; 264/15; 428/402; 428/325; 521/56; 521/60
[58] Field of Search ................... 428/402, 325; 264/13, 264/15; 521/56, 60; 106/75

[56] References Cited

U.S. PATENT DOCUMENTS

| | | | |
|---|---|---|---|
| 3,794,503 | 2/1974 | Netting | 428/103 |
| 3,796,777 | 3/1974 | Netting | 264/13 |
| 3,888,957 | 6/1975 | Netting | 264/13 |
| 3,896,196 | 7/1975 | Dickey | 264/13 |
| 4,049,593 | 9/1977 | Sato | 521/56 |
| 4,127,622 | 11/1978 | Watanabe et al. | 264/13 |
| 4,361,624 | 11/1982 | Spivack | 264/13 |

*Primary Examiner*—George F. Lesmes
*Assistant Examiner*—E. Rollins Buffalow
*Attorney, Agent, or Firm*—Ernest G. Posner; Fred C. Philpitt; J. Stephen Bobb

[57] ABSTRACT

More perfect, less porous hollow microspheres can be prepared by spray-drying dispersions of alkali metal silicate and "polysalt" that contain certain organic liquids. The organics are water-miscible and have boiling points of 100° C. or more. The solvent is added just prior to spray drying and the resulting product has fewer cracks and/or holes.

6 Claims, No Drawings

MANUFACTURING PROCESS FOR HOLLOW MICROSPHERES

This application is a continuation in part of my co-pending U.S. Pat. Application Ser. No. 253,139, filed Apr. 13, 1980, now abandoned.

BACKGROUND OF THE INVENTION

My invention relates to the preparation of hollow microspheres. In particular, my invention involves an improvement in the manufacture of hollow inorganic microspheres by spray drying from aqueous media, said improvement comprising the addition of a water-miscible organic liquid with a high boiling point to the solution of alkali metal silicate and polysalt to be spray dried. The resulting product has fewer imperfections such as holes and/or cracks, so that porosity is reduced.

Hollow microspheres can be prepared by spray drying solutions that contain nearly any film-forming substance. Spray drying is particularly suited to the preparation of hollow microspheres from solids dispersed in aqueous media. U.S. Pat. Nos. 3,796,777; 3,794,503 and 3,888,957 disclose hollow spheres prepared by spray drying alkali metal silicate solutions that have been combined with "polysalt" solutions, and then carefully drying the intermediate hollow spheres. The process by which these products are made must be tightly controlled to control the holes, cracks and other surface imperfections that contribute to porosity which is undesirable in these products.

It is an object of this invention to prepare hollow spheres with less porosity while allowing more latitude in processing conditions.

SUMMARY OF THE INVENTION

I have found that the addition of certain organic solvent-like liquids to aqueous dispersions of film-forming materials yields more perfect hollow microspheres. This improvement is especially beneficial to preparation systems consisting of alkali metal silicates and "polysalt." The organic liquids are alkali stable, water miscible and have boiling points of 100° C. or more. The organics remain in the shell of the sphere as the drying progresses so that said shell remains more flexible and penetrable to moisture. The resulting spheres are more perfect in surface conformation and much less porous than hollow microspheres manufactured without the benefit of my improvement.

THE INVENTION

Almost any film-forming substance which can be dispersed in water can be used to form largely hollow particles by spray drying. Film-forming systems that are of particular value in carrying out the process of this invention and which do not require the addition of a gas-forming substance as a blowing agent are disclosed in U.S. Pat. No. 3,796,777, hereby incorporated by reference. Hollow spheres are produced by forming a homogeneous aqueous solution comprising a sodium silicate and a polysalt selected from a group consisting of ammonium pentaborate, sodium pentaborate and sodium hexametaphosphate and then spray drying the solution under conditions necessary to produce hollow spheres of the size required. The spheres are further dried to reduce the water content and to set the walls. Such spheres have a bulk density of about 0.6 to 20 lbs/ft$^3$, a true particle density of about 2 to 40 lbs/ft$^3$ and a particle size of about 1 to 500 microns.

The organic plasticizer or co-reactant are solvent-like liquids that are water miscible, have a boiling point of 100° C. or more, are stable in highly alkaline solutions and should not adversely affect the sprayability of the silicate-polysalt combination. These characteristics need only be fleeting, less than about 3 minutes, as the organic material can be added immediately before spray drying. Organic liquids that have a number of hydroxyl groups or exposed oxygens are useful. Such compounds include polyhydric alcohols, mono and dialkyl ethers of alkylene glycols and poly(alkylene) glycols, and other water-miscible or soluble alcohols. Examples of useful materials are glycerol; ethylene glycol; diethylene glycol; triethylene glycol; trimethylene glycol; tetramethylene glycol; heptamethylene glycol; 1,2-propylene glycol; dipropylene glycol; 1,3-butylene glycol; 1,4-butylene glycol; 1,2,6-hexanetriol; 1,2,4-butanetriol, poly(ethylene) glycols and poly(propylene) glycols having molecular weights such that the compound is miscible with water; and monomethyl, monoethyl and monobutyl ethers of ethylene glycol, monomethyl and monoethyl ethers of triethylene glycol, and mixtures thereof. I prefer cellosolve, cellosolve acetate, ethyl cellosolve, diglyme, tetraglyme, polyvinyl alcohol, propylene glycol and ethylene glycol. Cellosolve, cellosolve acetate and ethyl cellosolve are 2-ethoxyethanol, hydroxy ethyl acetate, and ethoxyethanol, respectively. Diglyme and tetraglyme are the dimethyl ether of diethylene glycol and the dimethyl ether of tetraethylene glycol, respectively. About 0.5 to 5.0 parts by weight of the organic for each 100 pbw of the solids in the feed solution are required to provide the beneficial effects of the improved process.

The solution used to form hollow microspheres usually should contain 5 to 50% of the film-forming solids. The amount of organic additive to achieve improved results is between 0.5 and 5%, so that between 0.025 and 2.5% of the solution spray dried to form the hollow microspheres is organic. The film-forming system that I have found to particularly benefit from the improvement of my process comprises a homogeneous solution of sodium silicate and a "polysalt" wherein the ratio of "polysalt" solids to silicate solids should be between 0.02/1.0 and 3.0/1.0. U.S. Pat. No. 3,794,503, which is hereby incorporated by reference, describes "polysalts" as salts with anion to cation ratios that are reduced when the salts dissolve and become hydrolyzed. Ammonium pentaborate (APB), sodium pentaborate (SPB) and sodium hexametaphosphate (SHP) are preferred "polysalts." If a solution of APB and sodium silicate is used, the total solids would be 5 to 35% with 3 to 15% as APB; the ratio of APB solids to sodium silicate solids should be between 0.03:1.0 and 0.5:1.0 and preferably between 0.06:1.0 and 0.5:1.0. About 0.015 to 1.75% of the organic solvents would be added to such solutions. A system having 0.02 to 0.3 parts by weight (pbw) of SPB per pbw of sodium silicate solids contains 17.4 to 34.5% total solids and 6 to 7% SPB solids. This combination would require 0.087 to 1.7% of the appropriate organic. A system having 1 to 3 pbw of SHP per 1 pbw of silicate solids contains 29.6 to 48% of total solids. This combination requires 0.14 to 2.4% of the organic.

The process is initiated by preparing a solution of the film-forming solids in water, observing any required restrictions as to concentration, order of addition, temperature or the like. It is important that any restrictions relating to viscosity are observed; if the viscosity of the solution is too high when spray dried, fibers may result. After the homogeneous solution is prepared, the organic solvent-like liquid is added with rapid agitation to ensure proper dispersion. The resulting material is spray dried prior to any manifestation of instability such as rising viscosity or gelling. I prefer to spray dry within 10 minutes.

Any conventional spray drying equipment can be used to implement the process of this invention. The suspension-solution can be atomized into the spray tower by either an atomizer wheel or a spray nozzle. Since a wide range of film-forming materials and organic liquids can be used in this process a wide range of spray drying temperatures can be used. We have found that inlet temperatures of 100° to 500° C. can be used with outlet temperatures of about 80° to 300° C. In particular, I have found that satisfactory product can be prepared from the preferred film-forming system of sodium silicate and polysalt by spray drying the material at an inlet temperature of 200° to 500° C. and an outlet temperature of 100° to 300° C.

The product recovered from the spray dryer may be ready for packaging and/or use, or it may require an additional drying step. The systems that use water as the solvent, and especially the system utilizing sodium silicate and a polysalt, may require this additional drying step. The spray dried products from such water solvated systems usually contain more than 10% water. This water content is reduced to about 7% or less by slowly heating the particles to temperatures between 70° and 400° C.

The products of these process steps are hollow particles that are for the most part spherical with some agglomerated spheres. Some of the products are multicellular or multispherical. Multispherical particles are composed of spheres within spheres. The spherical products have particle diameters of about 1 to 500 micrometers. The products have fewer surface imperfections than microspheres made without my improvement and are therefore less porous. This difference in porosity is best demonstrated by comparing the effective density with the true particle density. For products that are porous the true particle density will be significantly higher than the effective density, while for products made by the improved process of my invention the true particle density is not that much increased over the effective density. The effective density is the value derived from the volume of a liquid resin displaced when the microspheres are first introduced into it. The true particle density is the value derived from displacement of air. Perfect spheres that are not porous will have an effective density that is equal to the true particle density. Microspheres made with just a sodium silicate and a "polysalt" may have as much as 50% difference between the bulk density and the true particle density, while microspheres made according to the teachings of my invention have only a difference of 5%. These results are even more impressive since they can be achieved with less tightly controlled reaction conditions such as spray dryer feed rate, spray dryer temperature and the rate of final drying.

The product of my improved process can be used for any purpose that prior art spheres presently fulfill.

EXAMPLES

The following examples illustrate certain embodiments of my invention. The purpose of these examples does not include establishing the scope of the invention which is defined in the disclosure and recited in the claims.

EXAMPLE 1

This example illustrates the prior art method of preparing hollow microspheres using the film-forming system of sodium silicate and a polysalt. Sodium silicate (500 pbw of 2.0 $SiO_2/Na_2O$, 44% solids) was thoroughly mixed with 500 pbw of a 10% APB solution heated to above about 60° C. Mixing was continued until any lumps were dispersed. The resulting homogeneous solution was fed to a spray dryer with an inlet temperature of about 410° C. and an outlet temperature of about 150° C. The atomizer pressure was 6 $kg/cm^2$. The product recovered was subjected to a further drying step in an oven. The initial temperature was below 100° C. and gradually the temperature was raised to about 300° C. in the period of an hour. Drying continued until the product contained less than 4% water. The product had a water content of 3.3%. Its effective density was 12 $lb/ft^3$ and the true particle density was 15 $lb/ft^3$.

EXAMPLE 2

This example illustrates the improvement of my invention. The method described in Example 1 was carried out except that 1 pbw of diglyme for each 100 pbw of solids was added to the silicate-APB solution before spray drying. The product recovered has 3.5% water and an effective density of 10 $lb/ft^3$ and a true particle density of 11 $lb/ft^3$.

I claim:

1. In a hollow microsphere with a shell consisting of an alkali metal silicate and a "polysalt" the improvement consisting of 0.5 to 5.0 parts by weight of a water-miscible porosity reducing organic liquid having a boiling point of at least 100° C. selected from the group consisting of polyhydric alcohols, and the mono- and dialkyl ethers of alkylene glycol or poly (alkylene) glycols being present in said shells for each 100 parts by weight of silicate and "polysalt" solids.

2. The hollow microsphere of claim 1 wherein the organic liquid is selected from the group consisting of glycerol; ethylene glycol; diethylene glycol; triethylene glycol; trimethylene glycol; tetramethylene glycol; heptamethylene glycol; 1,2-propylene glycol; dipropylene glycol; 1,3-butylene glycol; 1,4-butylene glycol; 1,2,6-hexanetriol; 1,2,4-butanetriol, poly(ethylene) glycols and poly(propylene) glycols having molecular weights such that the compound is miscible with water; and monomethyl, monoethyl and monobutyl ethers of ethylene glycol, monomethyl and monoethyl ethers of triethylene glycol, and mixtures thereof.

3. In a hollow microsphere with a shell consisting of an alkali metal silicate and a "polysalt" the improvement consisting of 0.5 to 5.0 parts by weight of a water-miscible porosity reducing organic liquid having a boiling point of at least 100° C. selected from the group consisting of cellosolve, cellosolve acetate, ethyl cellosolve, diglyme, tetraglyme, polyvinyl alcohol, propylene glycol and ethylene glycol being present in said shells for each 100 parts by weight of silicate and "polysalt" solids.

4. In a hollow microsphere with a shell consisting of an alkali metal silicate and ammonium pentaborate, sodium pentaborate and sodium hexametaphosphate the improvement consisting of 0.5 to 5.0 parts by weight of a water-miscible porosity reducing organic liquid having a boiling point of at least 100° C. selected from the group consisting of polyhydric alcohols, and the mono- and dialkyl ethers of alkylene glycol or poly (alkylene) glycols being present in said shells for each 100 parts by weight of silicate and "polysalt" solids.

5. The hollow microsphere of claim 4 wherein the organic liquid is selected from the group consisting of glycerol; ethylene glycol; diethylene glycol; triethylene glycol; trimethylene glycol; tetramethylene glycol; heptamethylene glycol; 1,2-propylene glycol; dipropylene glycol; 1,3-butylene glycol; 1,4-butylene glycol; 1,2,6-hexanetriol; 1,2,4-butanetriol, poly(ethylene) glycols and poly(propylene) glycols having molecular weights such that the compound is miscible with water; and monomethyl, monoethyl and monobutyl ethers of ethylene glycol, monomethyl and monoethyl ethers of triethylene glycol, and mixtures thereof.

6. In a hollow microsphere with a shell consisting of an alkali metal silicate and ammonium pentaborate, sodium pentaborate and sodium hexametaphosphate the improvement consisting of 0.5 to 5.0 parts by weight of a water-miscible porosity reducing organic liquid having a boiling point of at least 100° C. selected from the group consisting of cellosolve, cellosolve acetate, ethyl cellosolve, diglyme, tetraglyme, polyvinyl alcohol, propylene glycol and ethylene glycol being present in said shells for each 100 parts by weight of silicate and "polysalt" solids.

* * * * *